United States Patent [19]
Haruki et al.

[11] Patent Number: 5,171,956
[45] Date of Patent: Dec. 15, 1992

[54] ELECTRIC DISCHARGE MACHINE CAPABLE OF PREVENTING ELECTROLYTIC CORROSION ATTRIBUTABLE TO A SHORT-CIRCUIT DETECTING VOLTAGE

[75] Inventors: Obara Haruki, Toyama; Syunzo Izumiya, Fujiyoshida, both of Japan

[73] Assignee: Fanuc Ltd., Japan

[21] Appl. No.: 381,640

[22] PCT Filed: Jan. 24, 1989

[86] PCT No.: PCT/JP89/00062

§ 371 Date: Jul. 5, 1989

§ 102(e) Date: Jul. 5, 1989

[87] PCT Pub. No.: WO89/07029

PCT Pub. Date: Aug. 10, 1989

[30] Foreign Application Priority Data

Feb. 4, 1988 [JP] Japan .................. 63-22908

[51] Int. Cl.$^5$ .................. B23H 1/02; B23H 7/02; B23H 7/16
[52] U.S. Cl. .................. 219/69.13; 219/69.12; 219/69.19
[58] Field of Search .............. 219/69.13, 69.18, 69.12, 219/69.19

[56] References Cited

U.S. PATENT DOCUMENTS

| | | | |
|---|---|---|---|
| 2,866,921 | 12/1958 | Matulaitis et al. | 219/69.13 |
| 3,609,281 | 9/1971 | Kauffman | 219/69.13 |
| 3,617,680 | 11/1971 | Grosskopf | 219/69.19 |
| 3,627,967 | 12/1971 | Bertolasi | 219/69.19 |
| 3,825,713 | 7/1974 | Bell, Jr. | 219/69.13 |
| 3,927,293 | 12/1975 | Bell, Jr. | 219/69.13 |
| 4,614,854 | 9/1986 | Obara et al. | 219/69.13 |
| 4,654,497 | 3/1987 | Obara | 219/69.13 |
| 4,820,895 | 4/1989 | Obara | 219/69.13 |

FOREIGN PATENT DOCUMENTS 51-25953 8/1976 Japan.

*Primary Examiner*—Geoffrey S. Evans
*Attorney, Agent, or Firm*—Staas & Halsey

[57] ABSTRACT

A wire-cut electric discharge machine is provided, which is capable of preventing electrolytic corrosion of a workpiece attributable to an application of a short-circuit detecting voltage which is applied from a short-circuit detecting circuit in between the workpiece and a wire electrode, and is thus capable of producing products free from corrosive flaws. The electric discharge machine comprises a relay (20) for selectively short-circuiting the wire electrode (1) and the workpiece (2) with each other through a conductor (3), or a relay (40) for selectively disconnecting electrical connection between the short-circuit detecting circuit (8, 9) and the wire electrode through the conductor, these relays being operable to respond to a control output signal supplied from a numerical control unit (10). Upon completion of electric discharge machining, the relay (20 or 40) operates in response to the control output signal supplied from the numerical control unit, so as to short-circuit the wire electrode with the workpiece, or disconnect the short-circuit detecting circuit from the wire electrode, whereby the short-circuit detecting voltage is prevented from being applied in between the workpiece and the tool electrode.

6 Claims, 3 Drawing Sheets

ELECTRIC DISCHARGE MACHINE CAPABLE OF PREVENTING ELECTROLYTIC CORROSION ATTRIBUTABLE TO A SHORT-CIRCUIT DETECTING VOLTAGE

TECHNICAL FIELD

The present invention relates to an electric discharge machine of a type having a short-circuit detecting apparatus for positioning a workpiece and a tool electrode, and more particularly, to an electric discharge machine which is capable of preventing electrolytic corrosion attributable to an application of a short-circuit detecting voltage applied from a short-circuit detecting apparatus in between a workpiece and a tool electrode.

BACKGROUND ART

At start of electric discharge machining, positioning of a workpiece and a tool electrode must be made. Conventionally, short-circuit detecting means is employed for detection of the workpiece being brought at its reference surface in contact with the tool electrode, while the workpiece and the tool electrode are moved relatively to each other. The thus detected contact position is used as a basis for the positioning. More specifically, a typical short-circuit detecting means comprises a comparator having first and second input terminals which are supplied with a short-circuit detecting voltage and a reference voltage, respectively. The comparator is so arranged as to generate a signal, indicative of the workpiece being brought in contact with the tool electrode, in response to a change in the voltage appearing at the first input terminal connected to the tool electrode through a diode for shutting an electric discharge machining voltage, which change occurs when the workpiece and the tool electrode are brought in contact with each other so that the tool electrode is grounded through the workpiece.

In an electric discharge machine equipped with a short-circuit detecting means of the aforementioned type, the short-circuit detecting voltage is always applied, and hence the same voltage is applied in between the workpiece and the tool electrode through the diode when the electric discharge machining voltage is turned off. As a result, corrosion is liable to occur on the workpiece, in particular, of an electrolytically corrosive type.

DISCLOSURE OF THE INVENTION

The object of the present invention is to provide an electric discharge machine which is capable of preventing a workpiece from being corrosively damaged attributable to an application of a short-circuit detecting voltage which is applied from short-circuit detecting means in between the workpiece and a tool electrode.

In order to achieve the object, an electric discharge machine of the present invention comprises detection means for applying a short-circuit detecting voltage in between a workpiece and a tool electrode so as to detect short-circuit of the workpiece and the tool electrode, and means for selectively prohibiting an application of the short-circuit detecting voltage applied from the short-circuit detecting means in between the workpiece and the tool electrode.

As mentioned above, according to the present invention, since the application of the short-circuit detecting voltage from the short-circuit detecting means in between the workpiece and the tool electrode is selectively prohibited, the short-circuit detecting voltage can be prevented from being applied in between the workpiece and the tool electrode, and hence the workpiece can be prevented from being damaged attributable to the application of the same voltage, under a condition accompanied with no short-circuit detection for relative positioning of the workpiece and the tool electrode, e.g., under a condition where no electric discharge machining is effected, whereby it is possible to produce molded products free from corrosive flaws.

BEST MODE OF CARRYING OUT THE INVENTION

Figure 4:
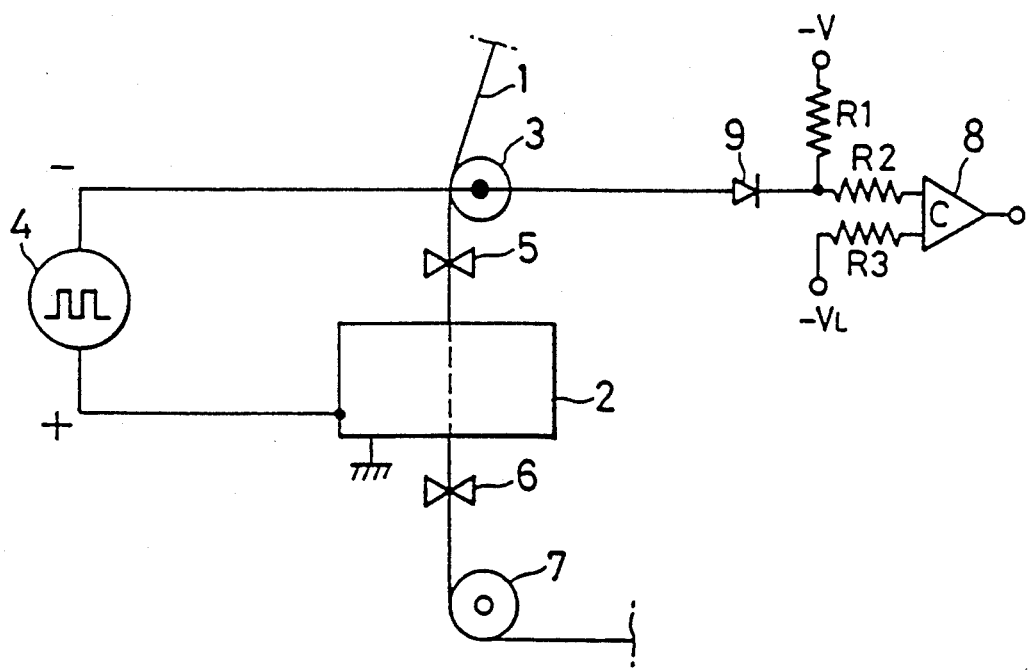
FIG. 4 is a view schematic showing a conventional apparatus.

Prior to giving an explanation of the present invention, a conventional wire-cut electric discharge machine equipped with a typical short-circuit detecting means will be explained with reference to FIG. 4. The electric discharge machine comprises: a machining electric power source 4 for supplying an electric current for machining, through a conductor 3, to a wire electrode 1 traveling along the conductor 3, an upper guide 5, a machining groove or hole formed in a workpiece 2, a lower guide 6, and a guide roller 7, which are respectively disposed between a wire supply reel and a wire delivery device (none of which is illustrated); and short-circuit detecting means for positioning the wire electrode 1 and the workpiece 2 relatively to each other. The short-circuit detecting means comprises a comparator 8 having first and second input terminals which are respectively supplied with a short-circuit detecting voltage $-V$ and a reference voltage $-VL$, and a diode 9 for grounding a machining voltage, an anode of the diode being connected to the conductor 3. The absolute value of the short-circuit detecting voltage $-V$ is set to a value less than that of the reference voltage $-VL$ and that of the voltage supplied from the machining power source 4. Reference numerals R1, R2 and R3 denote resistors, respectively.

In order to effect relative positioning, a work table (not shown) on which the workpiece 2 is mounted is moved horizontally. The comparator 8 has its output at a Low-level while the wire electrode 1 is out of contact with the workpiece 2. When the electrode and the workpiece are brought into contact with each other, the first input terminal of the comparator 8 is grounded through the diode 9, the conductor 3, the wire electrode 1, and the workpiece 2, so that the voltage appearing at the first input terminal has its absolute value larger than that of the reference voltage. As a result, a High-level output signal, indicative of a short-circuit condition, is delivered from the comparator 8. Meanwhile, even during electric discharge machining, the comparator 8 is operable to deliver the short-circuit detection signal when the wire electrode 1 is in contact with the workpiece 2.

During a non-machining condition, on one hand, the voltage supplied from the machining power source 4 is not applied to the diode 9, and on the other hand, the short-circuit detecting voltage −V is still applied to the comparator 8. As a result, an electric current attributable to the application of the short-circuit detecting voltage −V flows between the wire electrode 1 and the workpiece 2, resulting in corrosive flaws being formed on the workpiece.

Figure 1:
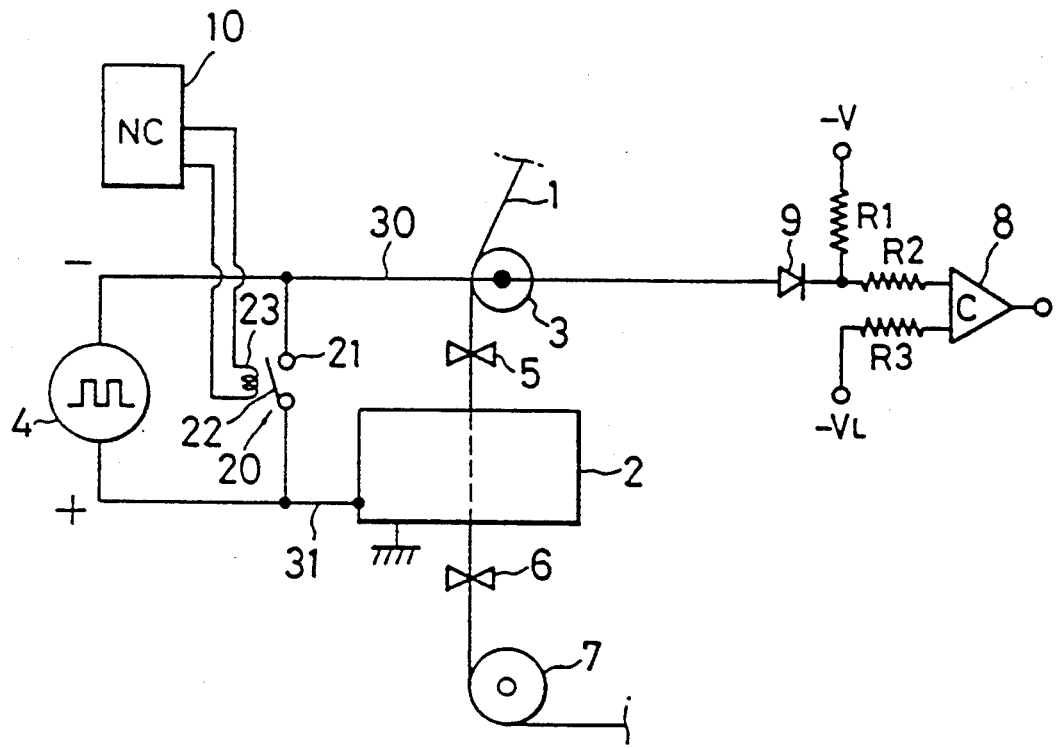
FIG. 1 is a schematic view showing an essential part of a wire-cut electric discharge machine according to a first embodiment of the present invention.

With reference to FIG. 1, a wire-cut electric discharge machine according to a first embodiment of the present invention will be explained. Elements common to FIGS. 1 and 4 are shown by like numerals, and explanations thereof will be omitted.

The electric discharge machine of FIG. 1 comprises a relay 20 for selectively causing the wire electrode 1 to be short-circuited with the workpiece 2. The relay 20 has a stationary contact 21 connected to a lead wire 30 which connects the conductor 3 with a negative terminal of the machining power source 4, a movable contact 22 connected to a lead wire 31 which connects a positive terminal of the power source with the workpiece 2, and an electromagnetic coil 23 for keeping these relay contacts 21, 22 at an OFF state in response to supply of a Low-level control output signal from a numerical control unit 10, which is operable to control various operations of the electric discharge machine.

Next, operation of the electric discharge machine of FIG. 1 will be explained.

Upon execution of electric discharge machining or of relative positioning of the wire electrode 1 and the workpiece 2, a Low-level control output signal is delivered from the numerical control unit 10 to the relay 20, so as to deenergize the electromagnetic coil 23 of the relay 20. As a result, the relay contacts 21, 22 are kept maintained at an OFF state. At this time, the electric discharge machine operates in the same manner as the apparatus of FIG. 4, and accordingly, an explanation of operation thereof will be omitted.

Upon completion of electric discharge machining, the numerical control unit 10 causes the control output signal to assume a High-level automatically or in response to an operator's manual operation. As a result, the relay contacts 21, 22 are turned on, so that the wire electrode 1 and the workpiece 2 are short-circuited with each other through the conductor 3. As a consequence, the application of the short-circuit detecting voltage −V in between the wire electrode 1 and the workpiece 2 is prevented, whereby electrolytic corrosion of the workpiece 2, attributable to an application of the short-circuit detecting voltage, is prevented. In the meantime, although the short-circuit detecting signal is delivered from the comparator 8 upon an ON operation of the relay 20, the electric discharge machine is so arranged as to nullify the generation of the short-circuit detecting signal when the relay is turned on.

Figure 2:
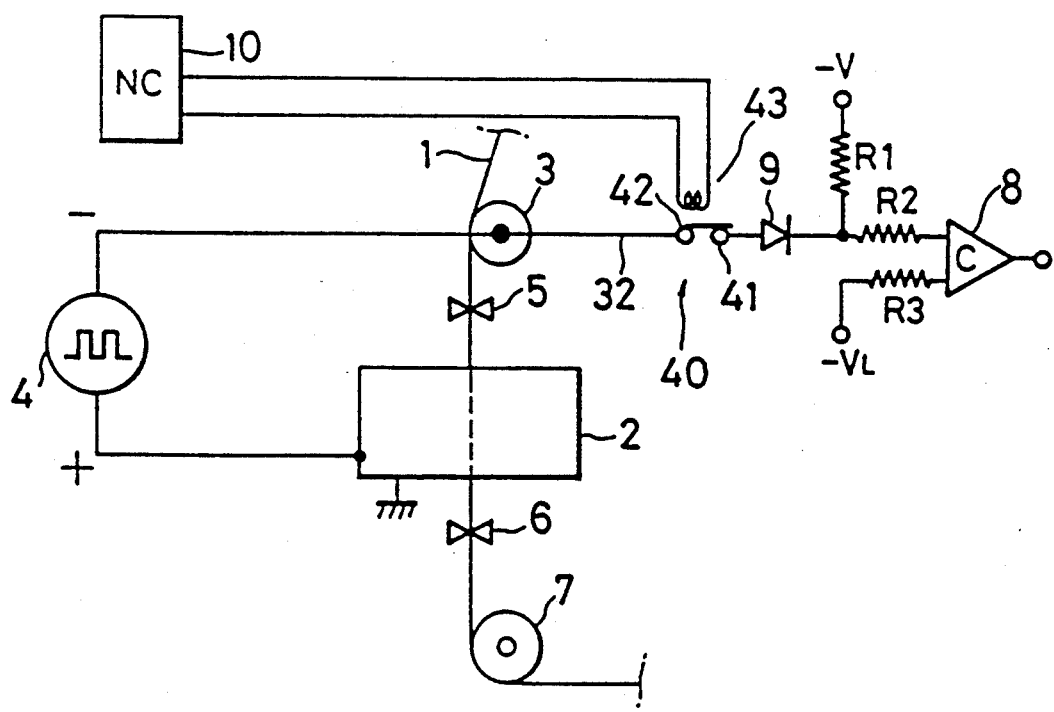
FIG. 2 is a schematic view, showing an electric discharge machine according to a second embodiment of the present invention.

FIG. 2 shows an electric discharge machine according to a second embodiment of the present invention. As compared with the machine of FIG. 1, this machine differs in that a relay 40 is provided instead of the relay 20. The relay 40 has stationary and movable contacts 41 and 42 which are interposedly disposed at middle of a lead wire 32 which connects a conductor 3 with a diode 9, and an electromagnetic coil 43 which responds to supply of a Low-level control output signal from a numerical control unit 10, for maintaining the relay contacts 41, 42 at an OFF state.

Figure 3:
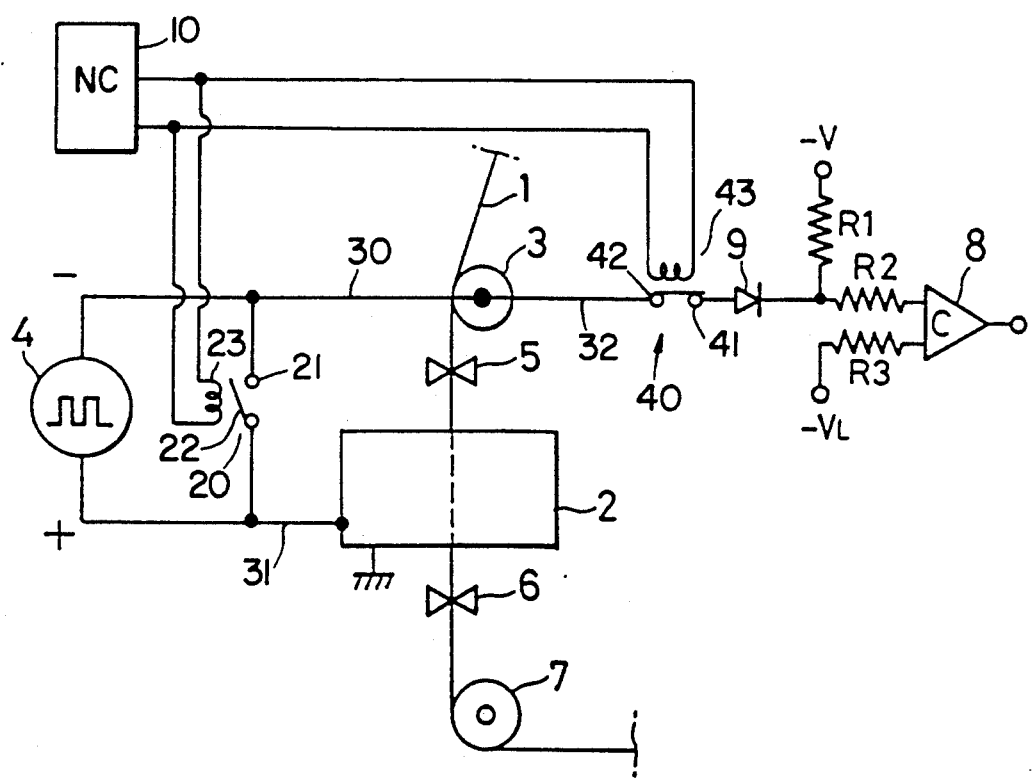
FIG. 3 is a schematic view showing an electric discharge machine according to a third embodiment of the present invention.

FIG. 3 shows an electric discharge machine according to a third embodiment of the present invention. As compared with the machine of FIG. 1, this machine differs in that the relay 40 of the second embodiment is combined with the relay 20 of the first embodiment.

Next, operation of the electric discharge machine of FIG. 3 will be explained.

Upon execution of electric discharge machining and relative positioning of the wire electrode 1 and the workpiece 2, the Low-level control output signal is delivered from the numerical control unit 10 to the relay 40, so that the electromagnetic coil 43 of the relay 40 is deenergized. As a consequence, the relay contacts 21, 22 are kept maintained at an ON state. At this time, the electric discharge machine operates in the same manner as the machines of FIGS. 1 and 4. Thus, an explanation of operation will be omitted.

Upon completion of electric discharge machining, the numerical control unit 10 causes the control output signal supplied to the relay 40 to assume its High level automatically or in response to an operator's manual keyboard operation. As a result, the relay contacts 21, 22 are turned off, so that the conductor 3 and the short-circuit detecting means, i.e., the wire electrode 1 and the short-circuit detecting means are electrically disconnected from each other. As a result, as in the case of the arrangement of FIG. 1, the short-circuit detecting voltage −V is prevented from being applied between the wire electrode 1 and the workpiece 2, whereby corrosion of the workpiece is prevented.

The present invention is not limited to the aforementioned embodiments. For example, a manual switch may be employed in place of the relay of the embodiments. Further, the short-circuit detecting means may be connected to the workpiece rather than the wire electrode. Moreover, the present invention may be applied to different types of electric discharge machines other than wire-cut electric discharge machines.

We claim:

1. An electric discharge machine for machining a workpiece with a tool electrode, comprising:
   detection means for applying a short-circuit detecting voltage between the workpiece and the tool electrode and for detecting a change in the short-circuit detecting voltage to indicate a short-circuit of the workpiece and the tool electrode based on a change in the short-circuit detecting voltage; and
   switching means for selectively prohibiting application of the short-circuit detecting voltage applied from the short-circuit detecting means between the workpiece and the tool electrode and selectively causing the workpiece and the tool electrode to be short-circuited with each other when the short-circuit is indicated by said detection means.

2. An electric discharge machine according to claim 1, further comprising:
   a diode connected in series from the tool electrode to said detection means.

3. An electric discharge machine according to claim 2, wherein said electric discharge machine has a first power supply for providing the short-circuit detecting voltage and a second power supply, wherein said detection means comprises:
   a comparator having first and second input terminals respectively coupled to the first and second power supplies and one of said first and second input terminals operatively coupled to said diode.

4. An electric discharge machine according to claim 3, wherein said detection means further comprises:
a first resistor connected between a first terminal of said diode and the first terminal of said comparator;
a second resistor connected between the first terminal of said diode and the first power supply; and
third resistor connected between the second power supply and the second terminal of said comparator.

5. An electric discharge machine according to claim 1, wherein said switching means comprises a switch connected between the workpiece and the tool electrode.

6. An electric discharge machine according to claim 5, wherein said switching means further comprises a remotely controlled relay operatively connected to said switch and said detection means.

* * * * *

UNITED STATES PATENT AND TRADEMARK OFFICE
CERTIFICATE OF CORRECTION

PATENT NO. : 5,171,956
DATED : December 15, 1992
INVENTOR(S) : Obara

It is certified that error appears in the above-indentified patent and that said Letters Patent is hereby corrected as shown below:

On title page, item [75] Inventors, change "Obara Haruki"

to --Haruki Obara--

Item [19] should read --Obara--

Column 2, line 22, change "view schematic" to --schematic view--.

Signed and Sealed this

Seventh Day of December, 1993

*Attest:*

BRUCE LEHMAN

*Attesting Officer*  *Commissioner of Patents and Trademarks*